Feb. 3, 1970  R. D. KELLER  3,493,738
SAMPLED DATA ANALOG DIVIDER
Filed Feb. 14, 1967

INVENTOR.
ROBERT D. KELLER
ATTORNEYS

United States Patent Office 3,493,738
Patented Feb. 3, 1970

3,493,738
SAMPLED DATA ANALOG DIVIDER
Robert D. Keller, Rolling Hills Estates, Calif., assignor to TRW Inc., Redondo Beach, Calif., a corporation of Ohio
Filed Feb. 14, 1967, Ser. No. 616,003
Int. Cl. G06g 7/16
U.S. Cl. 235—196                               11 Claims

ABSTRACT OF THE DISCLOSURE

An electronic apparatus for performing division on sampled analog data which apparatus responds to the application thereto of a first analog input signal representing a divisor and a second analog input signal representing a dividend for providing an output signal proportional to the quotient therebetween. The divisor and divident signals are held in separate holding circuits and permitted to discharge at corresponding rates. When the divisor discharges to a predetermined reference level, the dividend is sampled to thus provide a signal proportional to the quotient.

BACKGROUND OF THE INVENTION

Field of the invention

Various applications exist in which it is necessary to ascertain the quotient of two quantities which may, for example, be represented by analog voltages. For example, in certain tracking systems, space angles are determined by triangulation; i.e. by determining the distance of an object from each of two known positions. In such systems, the distances may be represented by voltages having amplitudes proportional to the distance. In order to ascertain the instantaneous angle, it is necessary to determine the quotient between the two distances or the voltages representative thereof.

As another example, it is not uncommon to incur multiplicative distortion in information systems caused by random transmission medium variations. The distortion can be eleminated by transmitting a reference signal, over the same medium as the information channel, which will incur the same multiplicative distortion as the information signal. The reference signal is divided into the information signal thereby eliminating the common mode multiplicative distortion. In addition, this operation normalizes the information signal.

This invention relates to electronic apparatus capable of performing division and other arithmetic operations with respect to analog input signals.

Description of the prior art

Oftentimes a division operation is accomplished by converting analog signals to digital signals and then digitally dividing in accordance with well known techniques. Some systems employ analog divider devices but many of these are unsuitable where the input signals may vary rapidly. In order to avoid inaccuracies occurring as a consequence of input signal variations, the dividend and divisor signals can be sampled at an appropriate frequency to provide representative pulses. In all known sampled data analog dividers, it is essential that the pulses be coincident in time. If the pulses are out of coincidence or if they have different rise times, substantial inaccuracies can result.

SUMMARY

The present invention is directed to an improved apparatus capable of accurately and inexpensively performing division and other arithmetic operations with respect to analog data.

Briefly, in accordance with the invention, pulses sampled from first and second analog signals are applied to separate holding circuits, e.g. Resistor-Capacitor (RC) circuits, having identical time constants. After the pulses terminate, the voltages held by the respective holding circuits will decrease exponentially at the same rate. When the voltage in one holding circuit reaches a predetermined level, a gate is opened to sample the voltage in the other holding circuit which will be of a value directly proportional to the ratio of the input pulses.

Apparatus in accordance with the invention, in addition to being useful for performing division, is capable of performing other operations such as finding a selected root of a number. Thus, embodiments of the invention find significant utility in many diverse applications and should by no means be considered as being limited to the aforementioned angle tracking, multiplicative distortion elimination, or signal normalization examples.

Figure 1:
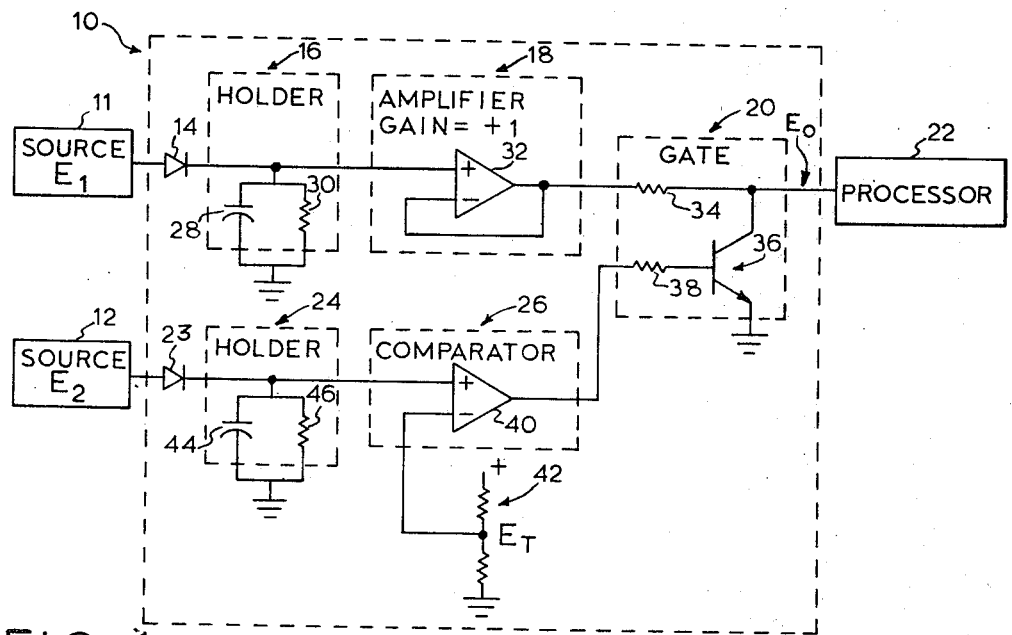
FIGURE 1 is a schematic block diagram of a preferred embodiment of the invention.

Attention is now called to FIGURE 1 which illustrates an apparatus 10 suitable for determining the quotient between first and second analog signals (not shown). The analog signals preferably are sampled at a rate, in accordance with the sampling theorem of Shannon, equal to twice the bandwidth of the signal. For purposes of explanation herein, it will be assumed that source 11 shown in FIGURE 1 provides a train of pulses $E_1$, the amplitude of each pulse being representative of the sampled amplitude of the analog signal which will be assumed to be the dividend. Similarly, source 12 of FIGURE 1 provides a train of pulses $E_2$, the amplitude of each pulse $E_2$ being representative of the sampled amplitude of the analog signal corresponding to the dividend.

Figure 2:
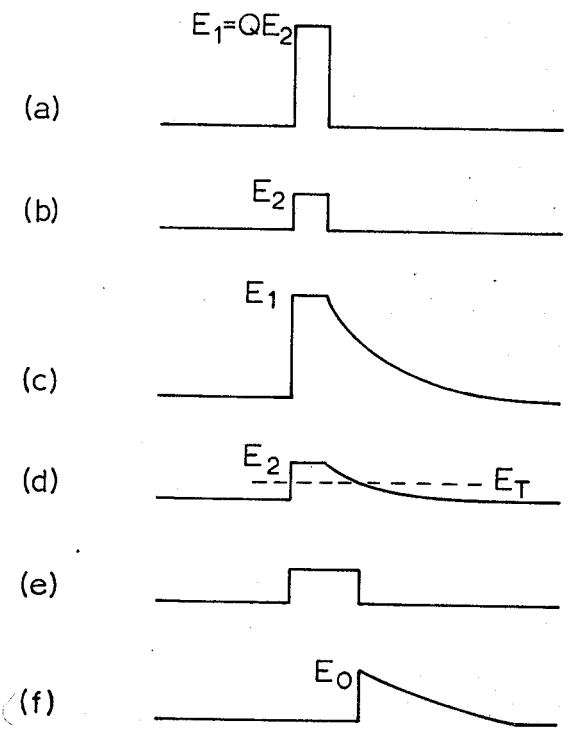
FIGURE 2 is a signal waveform chart illustrating various signals occurring in the circuit of FIGURE 1.

Lines $a$ and $b$ of FIGURE 2 respectively illustrate typical pulses $E_1$ and $E_2$. The apparatus of FIGURE 1 is intended to determine a ratio or quotient (Q) where Q is equal to $E_1/E_2$.

In accordance with the preferred embodiment of the invention illustrated in FIGURE 1, the source 11 is connected through a diode 14 to a first holding circuit 16 which in turn is connected through an amplifier stage 18 to a gate circuit 20.

The output of source 12 is connected through a diode 22 to a second holding circuit 24 which in turn is connected to a comparator 26. The output of the comparator 26 controls the gate 20. The output of the gate 20, as will be better understood hereinafter, provides a signal $E_0$ which is directly proportional to the quotient Q.

The holding circuit 16 of FIGURE 1 includes a first energy storage device which preferably comprises a capacitor 28 and an energy dissipation device which preferably comprises a resistor 30. The amplifier 18 can comprise a conventional operational amplifier 32 which can be connected so that the closed loop gain thereof is equal to +1. The output of the amplifier 18 is connected to the gate 20. More particularly, the amplifier 18 is connected through a resistor 34 to the collector of a transistor 36. The emitter of transistor 36 is connected to a source of reference potential, e.g. ground. The base of the transistor 36 is controlled through a resistor 38 by the output of a differential amplifier 40 in the comparator circuit 26.

A first terminal of the differential amplifier circuit 40 is connected to a threshold reference voltage $E_T$ defined by a voltage divider circuit 42. The second input terminal of differential amplifier 40 is connected to the holding circuit 24 which is comprised of a second energy storage device, e.g. a capacitor 44, and a second energy dissipation device, e.g. a resistor 46.

In the operation of the apparatus of FIGURE 1, assume it is desired to find the quotient Q between the dividend represented by the amplitude of pulse $E_1$ [line $a$, FIGURE 2] and the divisor represented by the amplitude of pulse $E_2$ [line $b$, FIGURE 2]. In response to the pulse $E_1$, the voltage across the capacitor 28 will rapidly charge to a level equal to the amplitude of pulse $E_1$ as represented by line $c$ of FIGURE 2. Similarly, the voltage across capacitor 44 will rapidly charge to the level of pulse $E_2$. It is to be noted that the capacitors 28 and 44 will respectively charge to the level of pulses $E_1$ and $E_2$ regardless of any differences in width of the pulses. Moreover, it should be apparent that the capacitors will charge up to the desired levels substantially independent of differences in pulse rise time since the charging time constant will be very small as a consequence of substantially no resistance in the charging circuit.

When the pulses provided by sources 11 and 12 terminate, the voltages across capacitors 28 and 44 respectively will decrease exponentially as shown in lines $c$ and $d$ of FIGURE 2. It will be apparent of course that each of the holding circuits 16 and 24 define discharge time constants determined by the values of the resistor and capacitor employed therein. As will become more apparent hereinafter, in order to perform the arithmetic operation of division, the discharge time constants of the holding circuits 16 and 24 should be identical so that the voltages as shown in lines $c$ and $d$ of FIGURE 2 will decrease at the same rate; e.g. after an interval, $\Delta t$, the voltage across both of the capacitors 28 and 44 will be the same percentage of the starting voltage thereacross.

For so long as the output of the holding circuit 24 exceeds the previously mentioned threshold reference potential $E_T$, the differential amplifier 40 of comparator 26 will provide an inhibit signal [FIGURE 2, line $e$] which forward biases transistor 36 thereby maintaining the collector thereof at substantially ground potential. The potential $E_0$ on the collector of transistor 36 is illustrated in line $f$ of FIGURE 2.

As the potential across capacitor 44 continues to decrease exponentially [line $d$, FIGURE 2], it will cross the threshold level $E_T$ thereby terminating the inhibit signal provided by the differential amplifier 40. As a consequence, transistor 36 will be cut off and the potential on the collector thereof, as shown in line $f$ of FIGURE 2, will rise to the output of the amplifier 32. As will be shown hereinafter, the output of the amplifier 32 which is effectively sampled at the termination of the inhibit pulse of line $e$ of FIGURE 2, is proportional to the quotient Q previously mentioned.

More particularly, it will be realized that the potential across the capacitor 44 when discharging is a function of time and can be expressed as $$E(t) = E_2 e^{-t/R_2 C_2} \quad (1)$$

where $E_2$ represents the starting potential, $e$ is the base of the natural logarithm system, $t$ represents the duration of discharge, $R_2$ represents the value of the resistor 46 and $C_2$ represents the value of the capacitor 44. Let the time duration $t_T$ be defined as that time, after the trailing edge of the divisor pulse, required for the potential $E_2$ to exponentially decrease to the threshold potential $E_T$. Thus, substituting these quantities in equation (1) and taking the logarithm of both sides of the equation, it is seen that:

$$ln E_T = ln E_2 e^{-t_T/R_2 C_2} \quad (2)$$

Equation 2 can be solved to determine the value $t_T$, $$t_T = -R_2 C_2 ln[E_T/E_2] \quad (3)$$

The potential across capacitor 28, sampled at time $t_T$ is defined as $E_0$ and can be expressed as $$E_0 = E_1 e^{-t_T/R_1 C_1} = [QE_2] e^{-t_T/R_1 C_1} \quad (4)$$

where $R_1$ represents the value of resistor 30 and $C_1$ represents the value of capacitor 28. Substituting the value $t_T$ from Equation 3 in Equation 4, and assuming that $R_1 C_1 = R_2 C_2$, Equation 5 results.

$$E_0 = [QE_2] e^{ln[E_T/E_2]} \quad (5)$$

which can be reduced to Equation 6 and subsequently to Equation 7.

$$E_0 = [QE_2] \frac{E_T}{E_2} \quad (6)$$

$$E_0 = QE_T \quad (7)$$

Thus, from the foregoing, it should be apparent that the peak of the output potential, $E_0$, appearing on the collector of the transistor 36 is equal to the product of the quotient Q times the threshold potential $E_T$. Since the potential $E_T$ is known and constant, the signal $E_0$ represents a direct measure of the quotient Q which can be employed by the processor 22 in order to perform triangulation problems, for example.

It will be recalled that in substituting the value $t_T$ in Equation 4 to arrive at Equation 5, the time constants for the holding circuits 16 and 24 were assumed to be identical (i.e. $R_1 C_1 = R_2 C_2$). If the time constants of the holding circuits 16 and 24 are different, the circuit of FIGURE 1 can be used to extract a selected root from a number. Thus, assume that it is desired to obtain the square root of the amplitude of pulse $E_3$. In order to do this, the pulse $E_3$ should be applied to both diodes 14 and 22.

It will be recalled that the output voltage $E_0$ is represented by $$E_0 = E_3 e^{-t_T/R_1 C_1} \quad (8)$$

Substituting for the value $t_T$, Equation 9 is obtained.

$$E_0 = E_3 e^{\left(\frac{R_2 C_2}{R_1 C_1} ln \frac{E_T}{E_3}\right)} = E_3 \left[ e\left(ln \frac{E_T}{E_3}\right) \right]^{\frac{R_2 C_2}{R_1 C_1}} \quad (9)$$

Equation 9 can be simplified to obtain Equation 10.

$$E_0 = E_3 \left(\frac{E_T}{E_3}\right)^{\frac{R_2 C_2}{R_1 C_1}} \quad (10)$$

It will be recognized from Equation 10 that by selecting the appropriate RC time constants, any desired root of the quantity $E_3$ can be obtained. Thus, assuming it is desired that the output signal $E_0$ be proportional to the square root of the starting voltage $E_3$, $R_2 C_2 / R_1 C_1$ should be made equal to ½. Then Equation 10 reduces to Equation 11 in which it will be recognized that the output signal $E_0$ is directly proportional to the square root of the input $E_3$.

$$E_0 = E_3^{½} E_T^{½} \quad (11)$$

From the foregoing, it should be appreciated that the circuit apparatus of FIGURE 1 is therefore capable of performing different arithmetic operations with respect to sampled analog data. The invention embodied in FIGURE 1 is characterized by certain extremely desirable characteristics which makes it considerably more useful than most known prior art systems. More specifically, whereas in most prior art divider systems, if the rise time of the pulse representing the dividend is significantly different from the rise time of the pulse representing the divisor, or if the pulse representing the dividend occurs prior to the pulse representing the divisor, then a gross measurement error will result. However, apparatus in accordance with the invention is relatively immune to this problem. It is to be noted that the apparatus of FIGURE 1 operates on each pulse in time essentially independent of prior pulses. Thus, in performing division, division will occur for each pulse independent of the pulses occurring prior or subsequent thereto.

Figure 3:
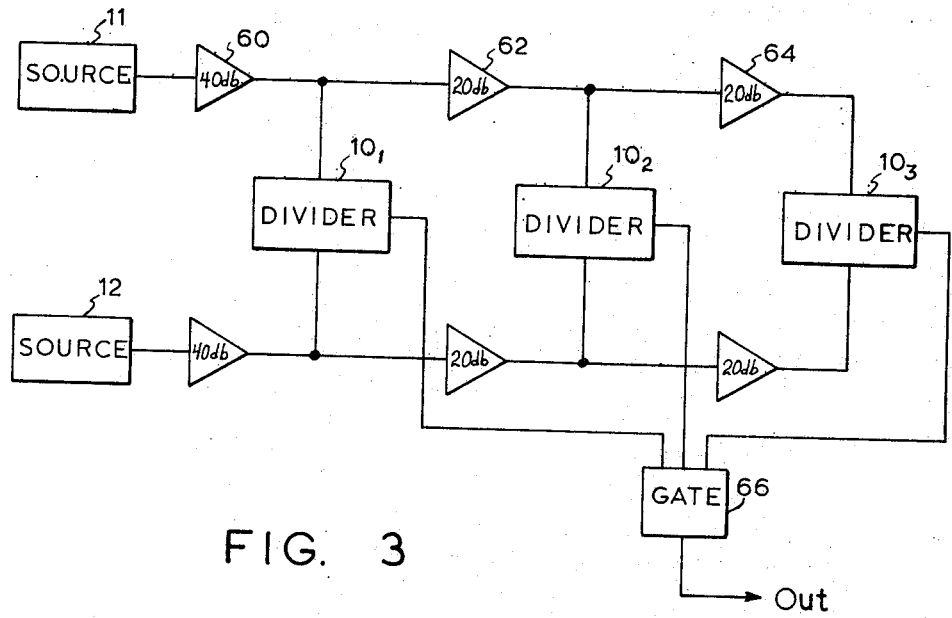
FIGURE 3 is a block diagram illustrating the manner in which a plurality of circuits of the type illustrated in FIGURE 1 can be interconnected so as to be operable over an extended dynamic range.

It is anticipated that it would be impractical to construct this divider to operate over a very wide dynamic range, e.g. in excess of sixty decibels. In order to extend the dynamic range, several dividers of the type shown in FIGURE 1 can be interconnected as shown in FIGURE 3. More particularly, FIGURE 3 illustrates three dividers $10_1$, $10_2$, and $10_3$ each of which can be identical to the divider apparatus 10 shown in FIGURE 1. Varying amounts of gain are connected between the sources 11 and 12 of FIGURE 3 and the dividers shown therein. Thus, source 11 for example is connected to divider $10_3$ through serially connected amplifiers 60, 62, and 64, which are respectively illustrated as introducing forty decibels, twenty decibels, and twenty decibels of gain. On the other hand, the output of amplifier 62 is connected to the divider $10_2$ so that the signal applied thereto has been stepped up by only sixty decibels. The input to divider $10_1$ is taken from the output of amplifier 60 so the signal thereto is thus stepped up by only forty decibels. The outputs from the dividers $10_1$, $10_2$, and $10_3$ are all connected to the inputs of gate 66. Gate 66 is responsive to the maximum signal applied thereto for providing a corresponding output signal.

Figure 4:
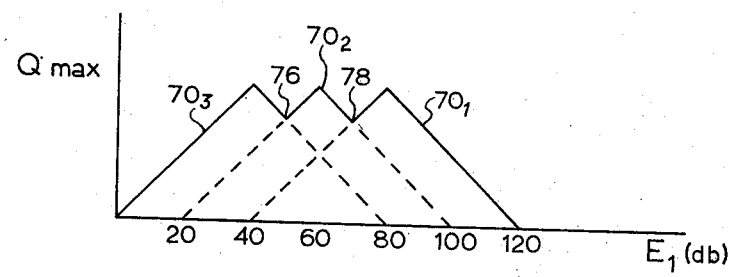
FIGURE 4 is a diagram graphically illustrating the manner in which the apparatus of FIGURE 3 functions.

FIGURE 4 illustrates the operating characteristics $70_1$, $70_2$, $70_3$ of the dividers $10_1$, $10_2$, $10_3$ respectively of FIGURE 3. Thus, for low levels of $E_1$, i.e. below saturation of the capacitors of divider $10_3$, divider $10_3$ will of course provide a larger output signal $E_0$ to the gate 66 than is provided by dividers $10_1$ and $10_2$. Thus the output of divider $10_3$ will be passed by gate 66. As the quotient Q and/or the level $E_1$ increases, the divider $10_3$ will saturate thereby limiting its accurate dynamic range. However, as the level of $E_1$ increases beyond point 76, for example, divider $10_2$ will begin to put out a larger output signal $E_0$ than divider $10_3$. Similarly, after the level of $E_1$ increases beyond point 78, the output of divider $10_1$, will become paramount. Thus, by interconnecting a plurality of dividers as shown in FIGURE 3, division and other arithmetic operations with respect to sampled analog data can be performed over an extended dynamic range.

From the foregoing, it should be appreciated that an apparatus has been disclosed herein capable of executing arithmetic operations with respect to sampled analog data over an extended dynamic range which apparatus is relatively immune to variations in rise times or degree of coincidence between the sampled pulses.

What is claimed is:

1. Apparatus capable of performing arithmetic operations on a plurality of independent variables comprising:
    first means including storage means therein for storing an instantaneous quantity of one of said variables and dissipation means for reducing said quantity at a first rate;
    second means including storage means therein for storing an instantaneous quantity of a second of said variables and dissipation means for reducing said quantity at a second rate; and
    means including connections between said first storage means and said second storage means responsive to the dissipation of said second stored quantity to a predetermined level for sampling the dissipated level of said quantity stored in said first means.

2. The apparatus of claim 1 wherein said storage means and said dissipation means in said first means respectively comprise a first capacitor and a first resistor defining a first time constant; and wherein
    said storage means and said dissipation means in said second means respectively comprise a second capacitor and a second resistor defining a second time constant.

3. The apparatus of claim 2 wherein said first and second time constants are equal to one another.

4. The apparatus of claim 3 including first and second sources respectively providing first and second voltage signals; and
    means respectively coupling said first and second voltage signals to said first and second means.

5. The apparatus of claim 2 wherein said first and second time constants are different from ane another.

6. The apparatus of claim 5 including a source providing a voltage signal; and
    means applying said voltage signal to said first and second means.

7. An apparatus for determining the quotient between a divisor and a dividend respectively represented by first and second amplitude modulated pulses, said apparatus comprising:
    (b) a first voltage storing circuit including means therein for dissipating the voltage stored thereby at a predetermined rate;
    (c) a second voltage storing circuit including means therein for dissipating the voltage stored thereby at a predetermined rate;
    (d) means respectively applying said first and second pulses to said first and second voltage storing circuits; and
    (e) comparator means including connections between said first voltage storing circuit and said second voltage storing circuit responsive to the voltage stored by said second storing circuit dissipating to a predetermined level for sampling the voltage stored by said first storing circuit.

8. The apparatus of claim 7 wherein said first voltage storing circuit includes a first capacitor and a first resistor defining a first time constant; and
    said second voltage storing circuit includes a second capacitor and a second resistor defining a second time constant equal to said first time constant.

9. The apparatus of claim 7 including gate means coupled to said first voltage storing circuit; and
    means responsive to said comparator means for controlling said gate means.

10. An apparatus for determining the 1/N root of a quantity represented by an amplitude modulated pulse, said apparatus comprising:
    a first voltage storing circuit including means therein for dissipating the voltage stored thereby at a predetermined rate;
    a second voltage storing circuit including means therein for dissipating the voltage stored thereby at a predetermined rate;
    means applying said amplitude modulated pulse to said first and second voltage storing circuits; and
    comparator means including connections between said first voltage storing circuit and said second voltage storing circuit responsive to the voltage stored by said second storing circuit dissipating to a predetermined level for sampling the voltage stored by said first storing circuit.

11. The apparatus of claim 7 wherein said first voltage storing circuit includes a first capacitor and a first resistor defining a first time constant; and
    said second voltage storing circuit includes a second capacitor and a second resistor defining a second time constant equal to 1/N times said first time constant.

References Cited

UNITED STATES PATENTS

| | | | |
|---|---|---|---|
| 2,934,274 | 4/1960 | Randolph et al. | 235—196 |
| 2,966,306 | 12/1960 | Isabeau | 235—196 X |
| 3,024,999 | 3/1962 | Heacock | 235—196 |
| 3,310,667 | 3/1967 | Offner | 235—196 X |

EUGENE G. BOTZ, Primary Examiner

JOSEPH F. RUGGIERO, Assistant Examiner

U.S. Cl. X.R.

307—229